(12) United States Patent
Koegel

(10) Patent No.: US 10,702,933 B2
(45) Date of Patent: Jul. 7, 2020

(54) UNIVERSAL EXTENSION FOR WORK SURFACES OF BENCH TOP POWER TOOLS AND WORK BENCHES

(71) Applicants: Robert Bosch GmbH, Stuttgart (DE); Robert Bosch Tool Corporation, Broadview, IL (US); Jan Koegel, Freudenstadt (DE)

(72) Inventor: Jan Koegel, Freudenstadt (DE)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 382 days.

(21) Appl. No.: 15/104,203

(22) PCT Filed: Dec. 12, 2014

(86) PCT No.: PCT/US2014/069966
§ 371 (c)(1),
(2) Date: Jun. 13, 2016

(87) PCT Pub. No.: WO2015/094953
PCT Pub. Date: Jun. 25, 2015

(65) Prior Publication Data
US 2016/0311040 A1 Oct. 27, 2016

Related U.S. Application Data

(60) Provisional application No. 61/918,702, filed on Dec. 20, 2013.

(51) Int. Cl.
*B23D 47/02* (2006.01)
*B25H 1/10* (2006.01)
*B23D 59/00* (2006.01)

(52) U.S. Cl.
CPC ........... *B23D 47/025* (2013.01); *B23D 59/00* (2013.01); *B25H 1/10* (2013.01); *Y10T 83/889* (2015.04)

(58) Field of Classification Search
CPC ........ B23D 59/00; B23D 47/025; B25H 1/10; Y10T 83/889
(Continued)

(56) References Cited

U.S. PATENT DOCUMENTS 1,585,563 A * 5/1926 Schlattau ................. G01B 3/00
33/471
3,695,189 A 10/1972 Felder, Jr.
(Continued)

FOREIGN PATENT DOCUMENTS

CN 2156733 Y 2/1994
DE 1947414 A1 5/1970
(Continued)

OTHER PUBLICATIONS

CN2156733 English Translation; Shu Li; Feb. 23, 1994; A46B5/00.*
(Continued)

*Primary Examiner* — Laura M Lee
(74) *Attorney, Agent, or Firm* — Maginot, Moore & Beck LLP

(57) ABSTRACT

An extension is configured to be removably coupled to a base of a bench top power tool or work bench by a connection such that an upper surface of the extension is coplanar with a work surface of the bench top power tool or work bench. The extension is configured to be movably coupled to the base to support workpieces of varying shape and size that do not fit easily on the work surface.

6 Claims, 15 Drawing Sheets

(58) Field of Classification Search
USPC ....... 144/287; 30/169; 83/698.11; 403/359.6, 403/298
See application file for complete search history.

(56) References Cited

U.S. PATENT DOCUMENTS

| | | | | |
|---|---|---|---|---|
| 4,068,551 | A | * | 1/1978 | Kreitz ................. B23D 47/025 108/48 |
| 4,077,290 | A | | 3/1978 | Hreha |
| 4,350,193 | A | | 9/1982 | McCambridge et al. |
| 4,406,200 | A | | 9/1983 | Kerr |
| 5,526,856 | A | | 6/1996 | Pedri |
| 5,564,323 | A | | 10/1996 | Sasaki et al. |
| 6,293,176 | B1 | | 9/2001 | Talesky |
| 6,581,656 | B1 | * | 6/2003 | Harper ................. B23D 47/025 144/286.5 |
| 7,240,707 | B1 | | 7/2007 | Schweitzer |
| 7,441,487 | B2 | | 10/2008 | Liu et al. |
| 8,025,001 | B2 | * | 9/2011 | Chen ................... B23D 47/025 144/287 |
| 8,418,591 | B2 | * | 4/2013 | Frolov ................. B23D 47/025 144/287 |
| 8,782,914 | B1 | * | 7/2014 | DeLuca ................... B43L 7/10 33/27.03 |
| 2010/0084221 | A1 | | 4/2010 | Cuccio |
| 2010/0269661 | A1 | | 10/2010 | Cox et al. |

FOREIGN PATENT DOCUMENTS

| | | |
|---|---|---|
| DE | 47002 C | 3/1988 |
| DE | 3706921 A1 | 9/1988 |
| DE | 48098 C | 12/1988 |
| DE | 202006012601 U1 | 11/2006 |
| DE | 102010062255 A1 | 6/2012 |
| EP | 0681890 A1 | 11/1995 |
| JP | 2005137827 A | 6/2005 |
| TW | M277546 U | 10/2005 |

OTHER PUBLICATIONS

International Search Report corresponding to PCT Application No. PCT/US2014/069966, dated Mar. 20, 2015 (3 pages).
Supplementary Partial European Search Report corresponding to European Patent Application No. 14 87 1303.
English Translation of Taiwan Examination Report corresponding to Taiwan Patent Application No. 103143755 (7 pages).
English Translation of Chinese 2nd Office Action corresponding to Chinese Patent Application 201480075997.5 (8 pages).

* cited by examiner

UNIVERSAL EXTENSION FOR WORK SURFACES OF BENCH TOP POWER TOOLS AND WORK BENCHES

PRIORITY CLAIM

This application is a 35 U.S.C. § 371 National Stage Application of PCT/US2014/069966, filed on Dec. 12, 2014, which claims the benefit of priority to U.S. Provisional Patent Application No. 61/918,702, filed on Dec. 20, 2013 for "Universal Extension for Work Surfaces of Bench Top Power Tools and Work Benches," the disclosures of which are incorporated herein by reference in their entirety.

TECHNICAL FIELD

The present disclosure relates generally to work surfaces of bench top power tools and workbenches, and more particularly to extensions for such work surfaces.

BACKGROUND

Bench top power tools and workbenches are used to perform various cutting, sawing, and milling activities on workpieces. To this end, bench top power tools and workbenches include a flat, planer work surface to support the workpiece while the activity is performed. For example, miter saws (like those shown in FIGS. 12 and 13) are bench top power tools used to make chop cuts in workpieces that are held stationary on the work surface, and table saws (like those shown in FIGS. 14 and 15) are bench top power tools used to make rip cuts in workpieces that are moved along the work surface. In the case of a larger workpiece to be cut, the work surface may not be large enough to provide adequate support during the activity. Accordingly, some bench top power tools and workbenches include extensions which are extendable from bench top power tools and workbenches to provide additional support for a workpiece that is spaced apart from the work surface.

FIGS. 12 and 13 depict two known versions of side extensions for miter saws 10. FIG. 12 depicts a version that includes full metal rods 12 and a die casted aluminum support block 14 on each side of the miter saw base and FIG. 13 depicts a version that includes a "U" shaped metal rod 16 with a support portion 18 on each side of the miter saw base. These versions are expensive and difficult to design and implement because the miter saw bases must be designed to accept the metal rods and the support blocks, and because the metal rods and support blocks must be designed to be as lightweight and compact as possible while still providing adequate additional support when extended. To enable a light weight and a low mass of materials used to form the extensions, the metal rods are formed as thin connections and the extensions are configured to support the workpiece only on the support blocks and support portions rather than along the entire length of the metal rods. Such configurations provide punctuated support for the workpiece, which is not as stable or safe as providing continuous support.

FIGS. 14 and 15 depict two known versions of extensions for table saws. FIG. 14 depicts a side extension for a table saw 20 that includes extension rods 22, a connection guide 24 on the table saw base to accept the extension rods 22, and a side extension support plate 26. Similarly, FIG. 15 depicts a rear extension for a table saw 20 that includes extension rods 28, connection guide elements 30 for connection to the table saw base, and a rear extension support plate 32. In the same manner as the miter saw extensions described above, the table saw extensions include extension rods formed as thin connections, and the extensions are configured to support the workpiece only on the support plates to enable a light weight and a low mass of materials to form lightweight and compact supports. These extensions are heavy and expensive to make and implement. While the known extensions provide support to large workpieces that is spaced apart from the work surface, users desire improved extensions that are inexpensive to make and implement, are lightweight, and that provide superior support and safety to users.

SUMMARY

Embodiments of the present disclosure are directed to extensions to be removably attached to work surfaces, such as work surfaces for bench top power tools, to extend the work surfaces to accommodate larger work pieces. The extensions are configured to be used interchangeably on any compatible power tools or workbenches.

DETAILED DESCRIPTION

Figure 1A:
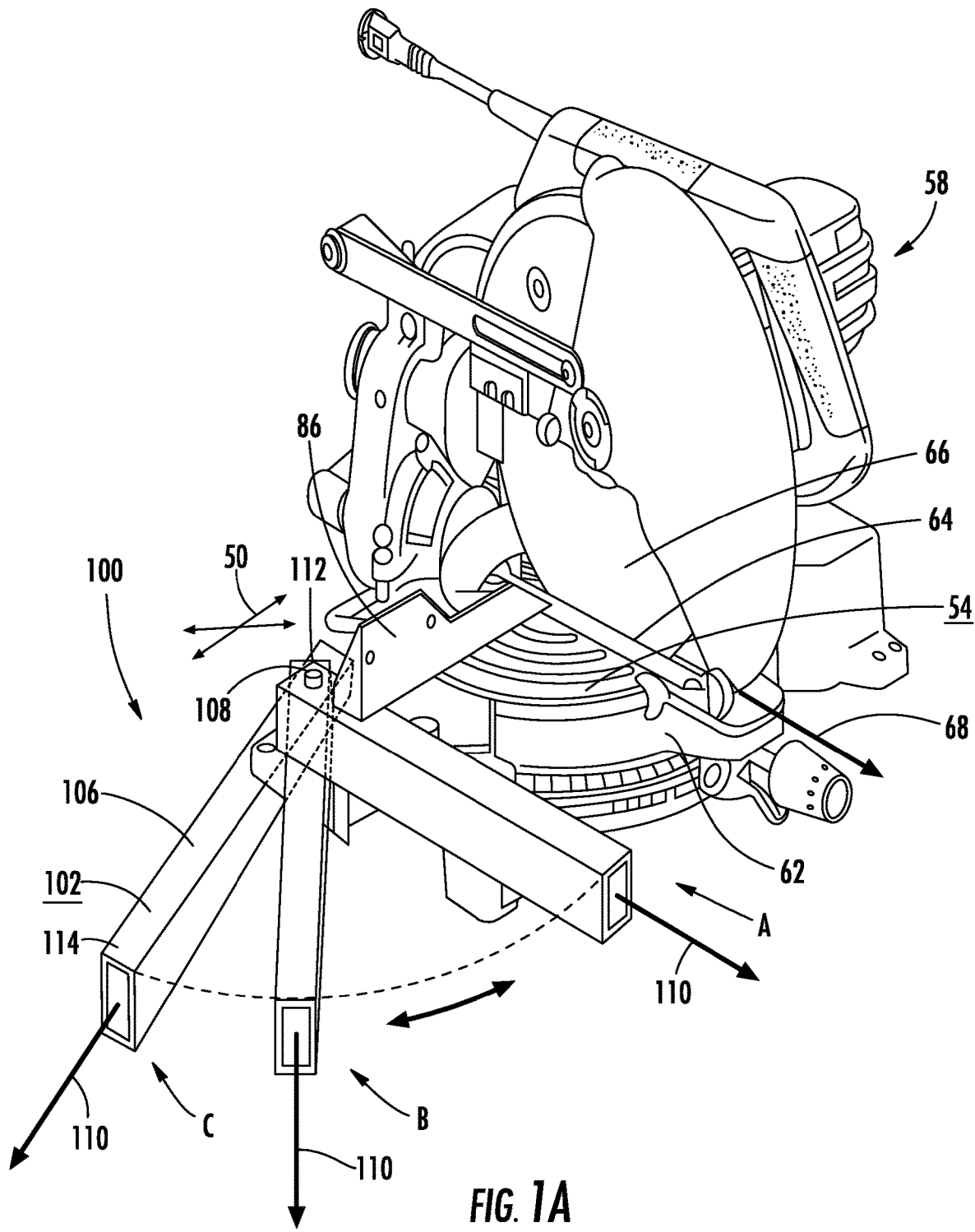
FIG. 1A is a top perspective view of a miter saw with a rotating extension coupled thereto.

The present disclosure is directed to improved extensions for work surfaces, such as work surfaces for bench top power tools and workbenches, shown in FIGS. 1-10. In each embodiment, the extension 100, 200, 300, 400, 500, 700, 900 includes an upper surface 102, 202, 302, 402, 502, 702, 902 which is substantially planar, and the extension is configured to be arranged so that the upper surface is coplanar with a plane 50 defined by the work surface 54 of each of the representative bench top power tools and workbenches 58. Accordingly, an advantage of the extensions 100, 200, 300, 400, 500, 700, 900 of the present disclosure is that they provide a continuous support along the length of the extension that is coplanar with the work surface 54 of the bench top power tools and workbenches 58.

Figure 11:
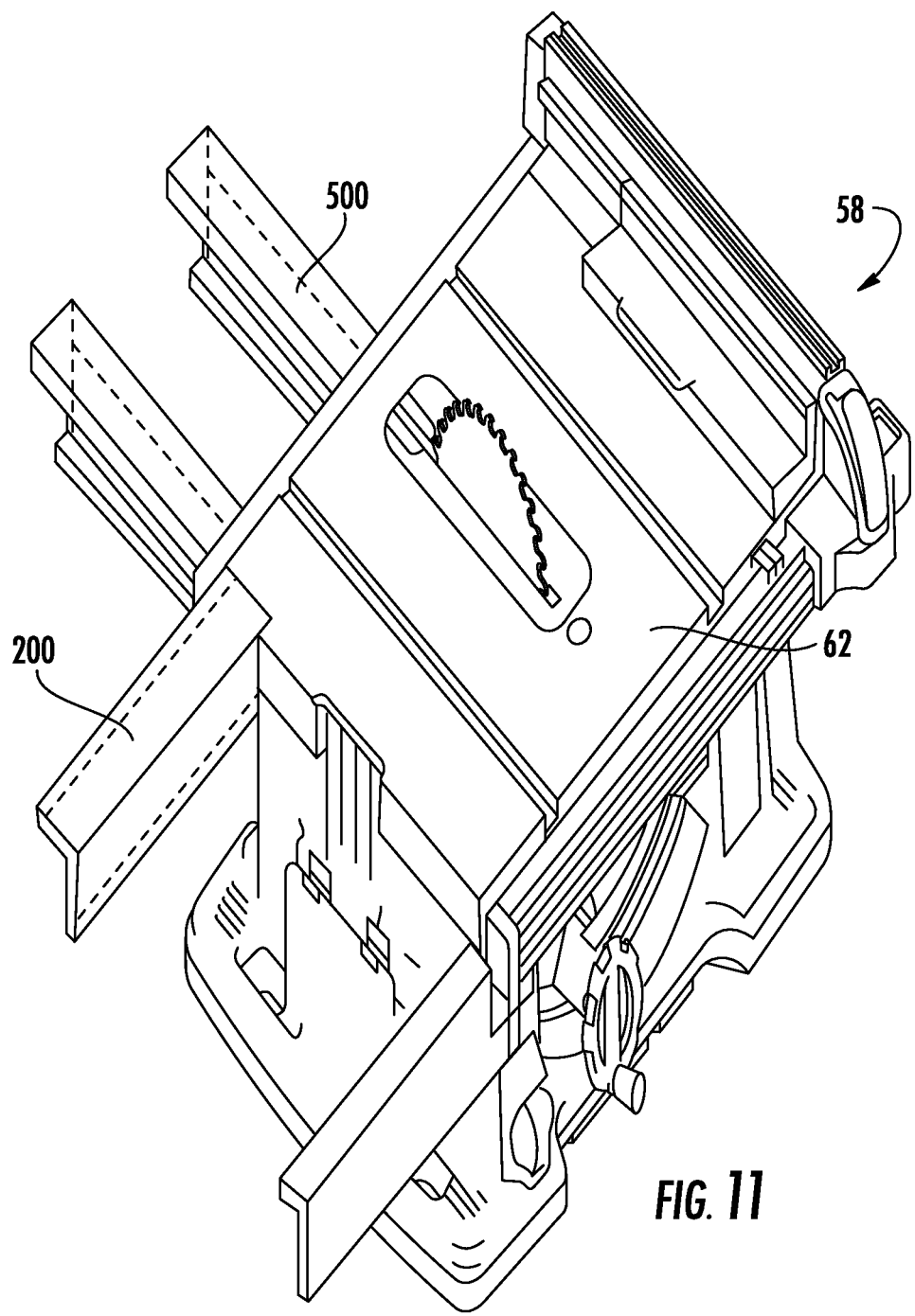
FIG. 11 depicts a top perspective view of a table saw having multiple extensions attached thereto.
Figure 12:
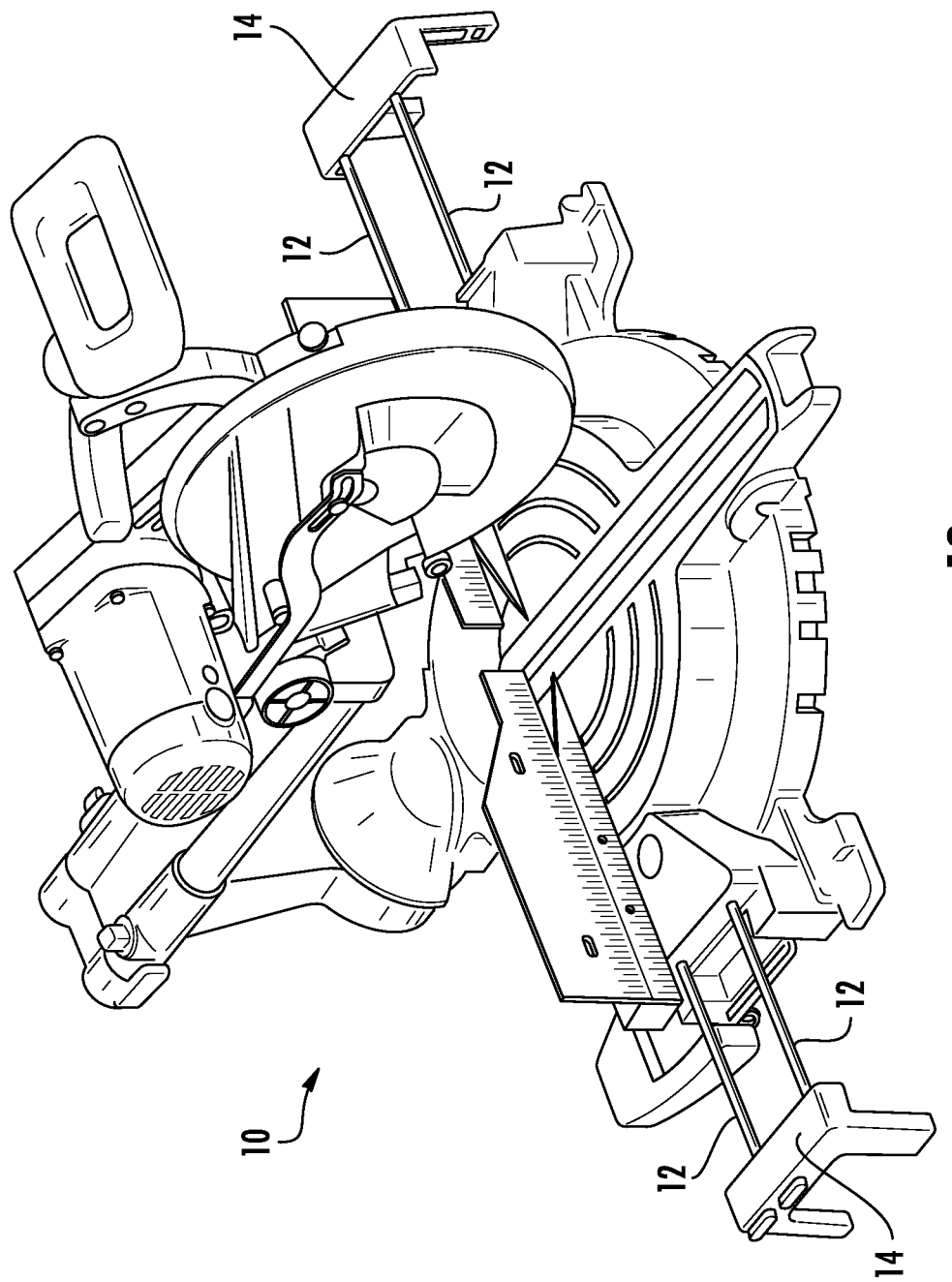
FIG. 12 depicts a top perspective view of a prior art miter saw including side extensions attached thereto.
Figure 13:
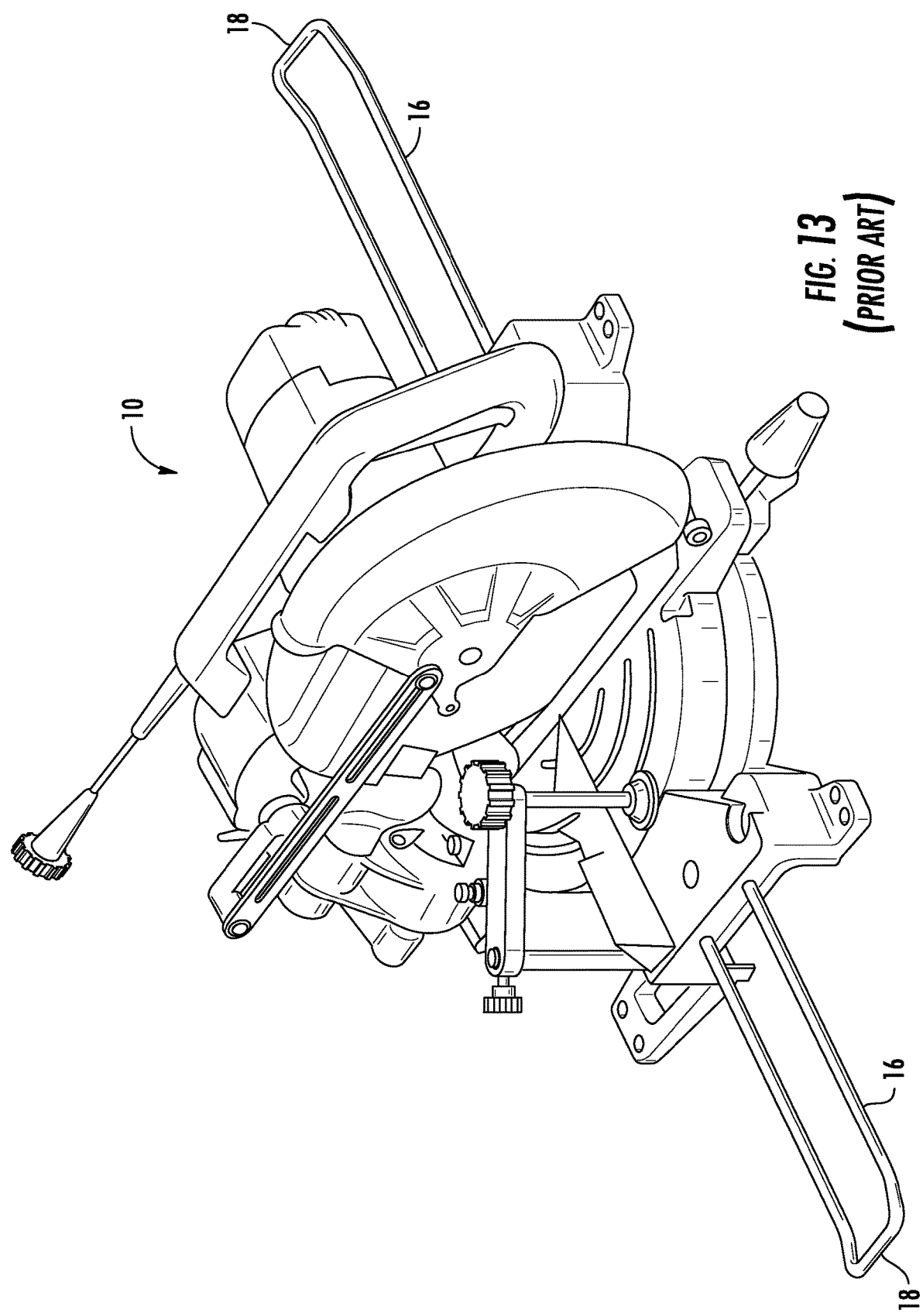
FIG. 13 depicts a top perspective view of another prior art miter saw including side extensions attached thereto.
Figure 14:
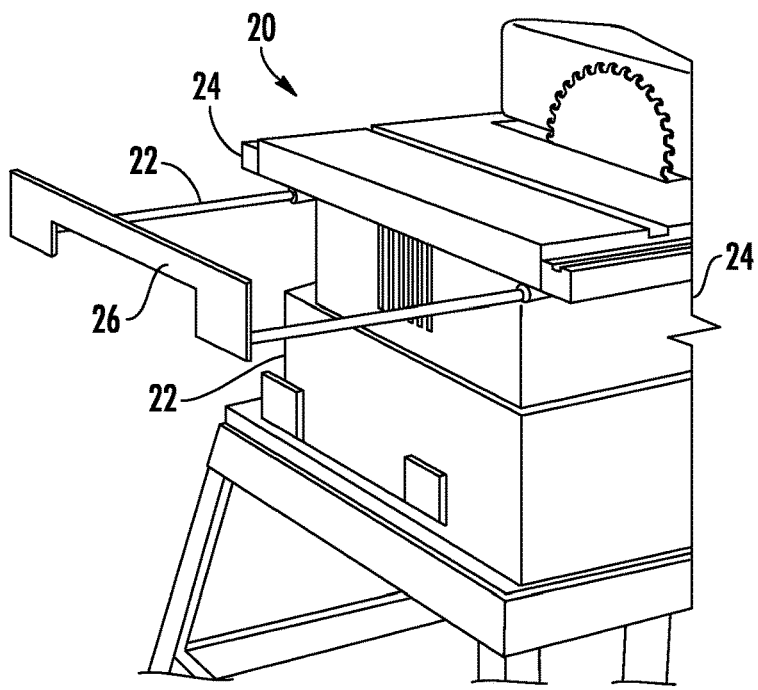
FIG. 14 depicts a top perspective view of a portion of a prior art table saw including a side extension attached thereto.
Figure 15:
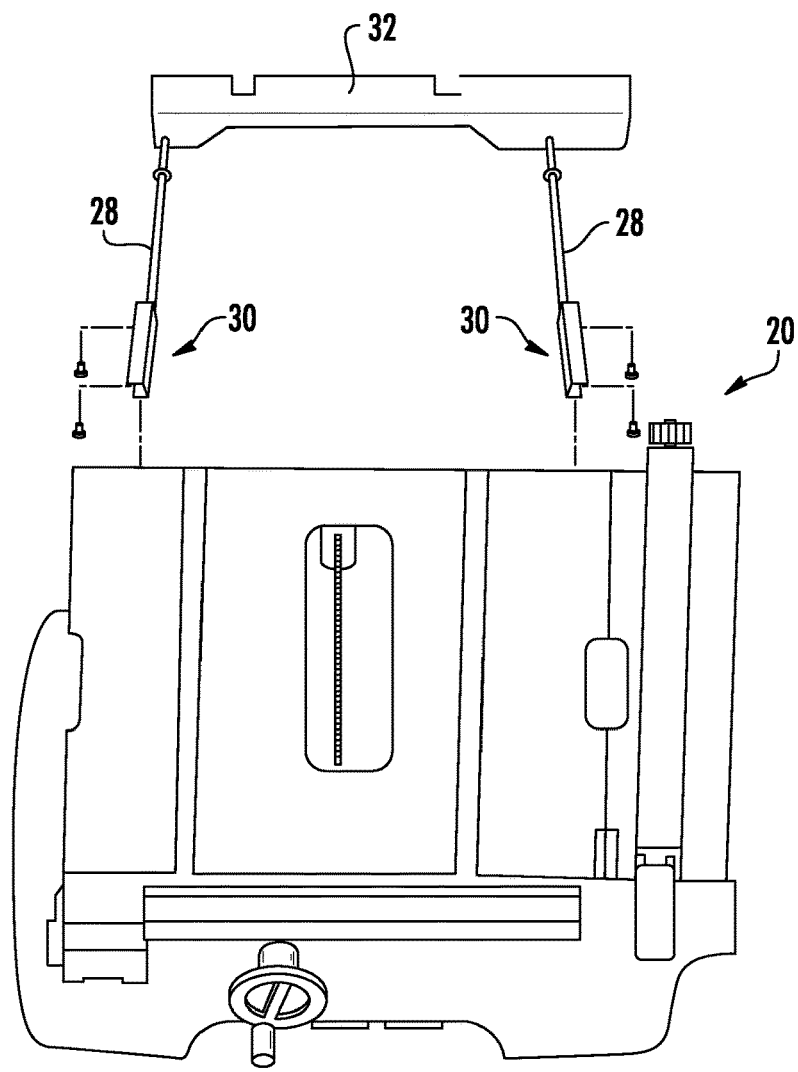
FIG. 15 depicts a front perspective view of a portion of another prior art table saw including a rear extension detached therefrom.

Another advantage of the particular extensions 100, 200, 300, 400, 500, 700, 900 of the present disclosure is that they enable easy, intuitive attachment to and detachment from bench top power tools and workbenches 58. Another advantage of the extensions 100, 200, 300, 400, 500, 700, 900 of the present disclosure is that they are interchangeable between compatible bench top power tools and workbenches 58. Accordingly, a user can attach one of the extensions 100, 200, 300, 400, 500, 700, 900 to a compatible bench top power tool 58, remove the extension 100, 200, 300, 400, 500, 700, 900 from that bench top power tool 58, and then attach the extension 100, 200, 300, 400, 500, 700, 900 to a compatible workbench 58. Additionally, multiple types of extensions 100, 200, 300, 400, 500, 700, 900 can be used on a single bench top power tool 58, as shown in FIG. 11.

The extensions 100, 200, 300, 400, 500, 700, 900 can have different cross-sectional shapes, different attachment methods, and provide different types of support which can be mixed and matched on a single bench top power tool or workbench 58. Additionally, as shown in FIG. 11, an extension can also be used as auxiliary fence that can be attached to a rip fence of a table saw to allow even further functionality of the extensions 100, 200, 300, 400, 500, 700, 900.

The extensions 100, 200, 300, 400, 500, 700, 900 of the present disclosure can be formed of aluminum, or another metal having similar strength and weight properties, and can be formed by extrusion to produce extensions of varying cross-sectional shapes and lengths. This is advantageous because aluminum is lightweight and strong, because forming by extrusion is relatively inexpensive, and because producing extensions of varying cross-sectional shapes and lengths enables extensions to be formed which are best suited to various applications.

Figure 1B:
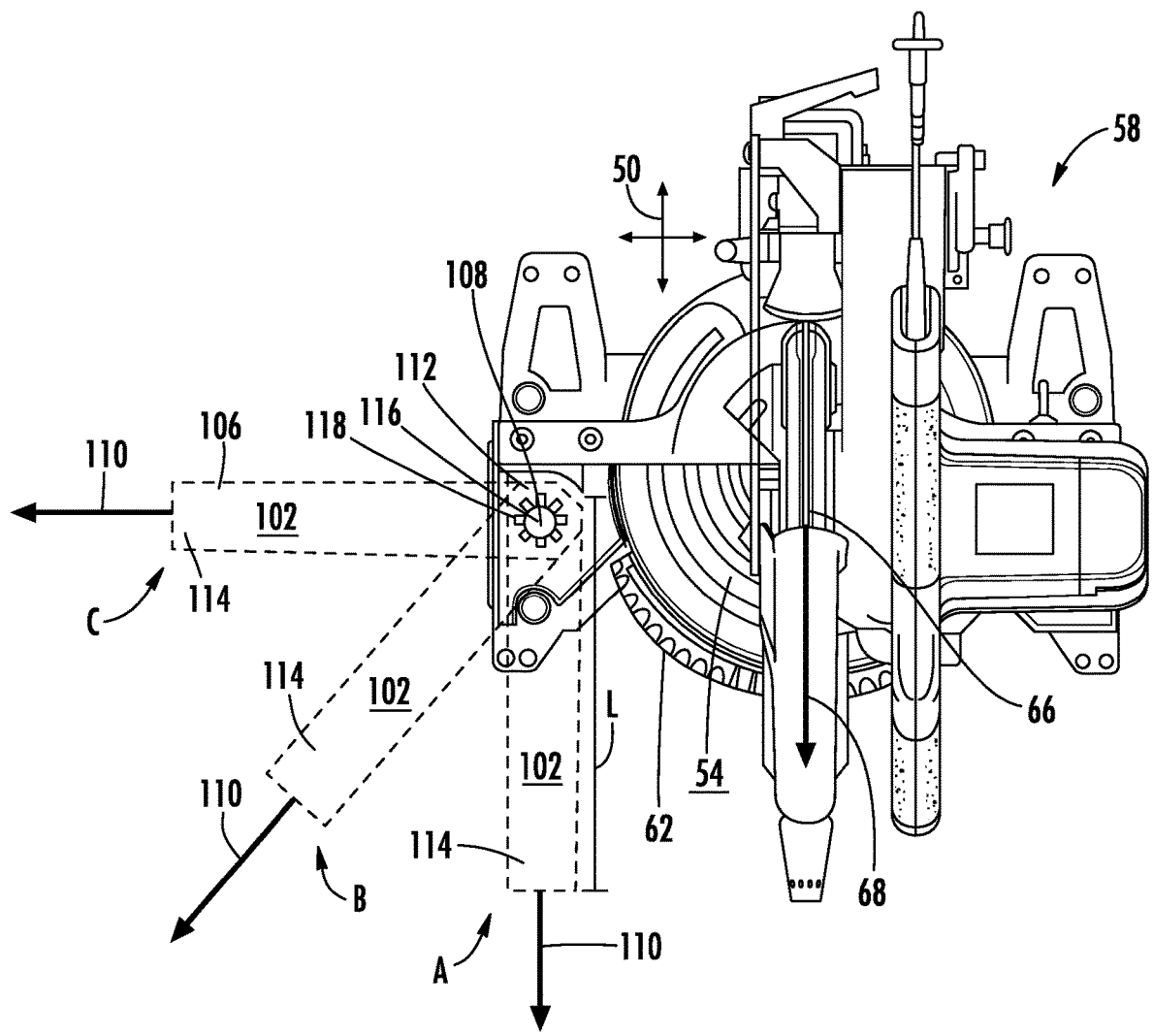
FIG. 1B is a top plan view of the miter saw and rotating extension shown in FIG. 1A.

Turning to FIGS. 1A and 1B, a first embodiment of a universal extension, a rotating extension 100, is shown coupled to a bench top power tool 58. In particular, the bench top power tool 58 is a miter saw, and the rotating extension 100 is coupled to a base 62 of the miter saw 58. The rotating extension 100 can be coupled to the base 62 in a location behind a fence 86 (as shown in FIG. 1A) so that the fence 86 is located generally between the rotating extension 100 and the saw blade 66, or the rotating extension 100 can be coupled to the base 62 in a location in front of the fence 86 (as shown in FIG. 1B) so that the fence 86 is not located generally between the rotating extension 100 and the saw blade 66. The rotating extension 100 includes a body 106 and a connector 108 configured to rotatably couple the body 106 to the base 102 of the miter saw 104. The body 106 may be hollow and is elongated with a rectangular cross-section and defines a body axis 110 through the center of the body 106 in the elongated direction of the body 106. The rectangular cross-section of the body 106 is defined in a direction perpendicular to the body axis 110 and perpendicular to the plane 50 of the miter saw 58. The body 106 also includes a connection end 112 at one end of the elongated body and an extension end 114 at the other end of the elongated body. The connection end 112 of the body 106 is rotatably coupled to the base 62 of the miter saw 58 with the connector 108, and the extension end 114 projects away from the base 62 of the miter saw 58.

The upper surface 102 of the body 106 extends from the connection end 112 to the extension end 114 and provides a stable surface on which a workpiece supported by and extending beyond the work surface 54 of the miter saw 58 can rest. The hollow configuration of the body 106 maintains a light weight of the body 106 without sacrificing strength and structural support. Thus, when a workpiece is placed on the miter saw 58 and the rotating extension 100, the workpiece is continuously and stably supported by both the work surface 54 of the miter saw 58 and the upper surface 102 of the body 106.

The connector 108 is coupled to the connection end 112 of the body 106 and to the miter saw base 62 such that the body 106 is rotatable relative to the miter saw base 62. As a frame of reference, the body 106 is rotatable relative to a longitudinal direction 68 of a blade opening 64 formed in the work surface 54 of the miter saw 58 which is configured to receive a saw blade 66 therein. In other words, as the body 106 rotates relative to the base 62, the body axis 110 will rotate relative to the longitudinal direction of the blade opening 64. As shown in FIG. 1A, the body 106 can be rotated to a first position A, wherein the body axis 110 is substantially parallel to the longitudinal direction 68, a second position B, wherein the body axis 110 is arranged at an angle of approximately 45 degrees relative to the longitudinal direction 68, and a third position C, wherein the body axis 110 is arranged at an angle of approximately 90 degrees relative to the longitudinal direction 68.

As shown in FIG. 1B, the body 106 also defines a length L extending from the connection end 112 to the extension end 114. As the body 106 is rotated relative to the base 62, the length L projects in different directions relative to the base 62. Accordingly, when the body 106 is in the first position A, the upper surface 102 extends substantially forwardly to enable the miter saw 58 to support a wider workpiece on the work surface 54 of the base 62 and the upper surface 102 of the body 106. In contrast, when the body 106 is in the third position C, the upper surface 102 extends substantially to the side to enable the miter saw 58 to support a longer workpiece on the work surface 54 of the base 62 and the upper surface 102 of the body 106.

Figure 2:
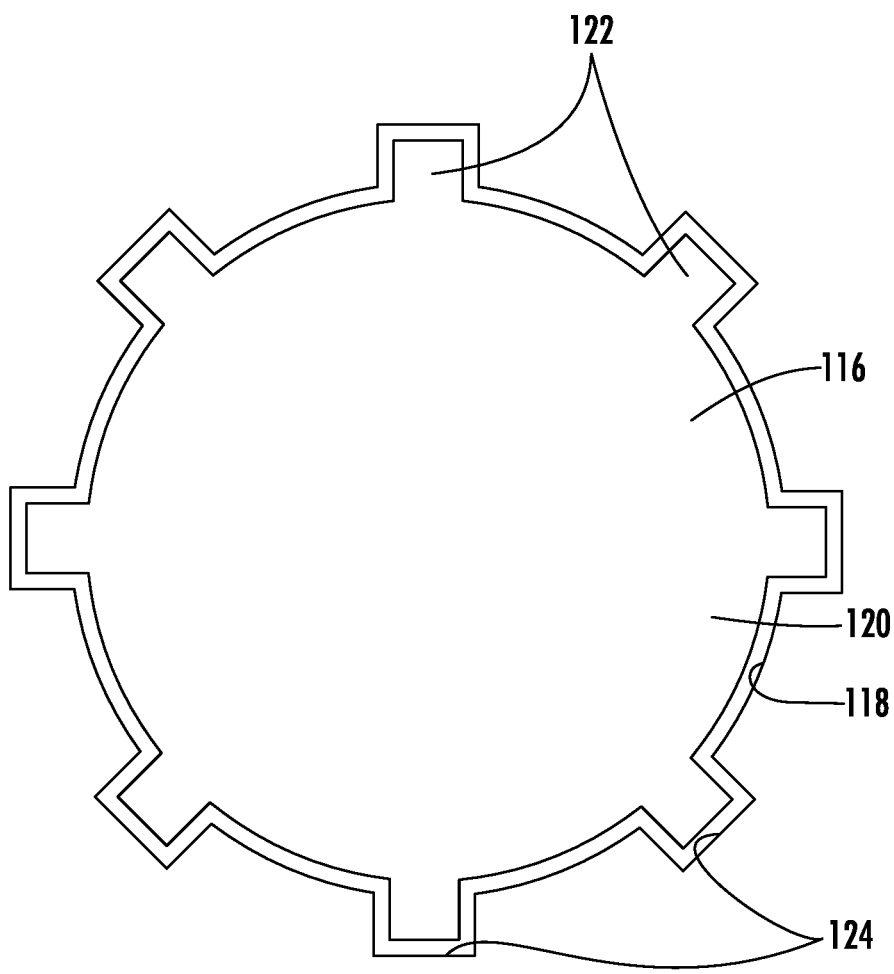
FIG. 2 depicts a schematic drawing of a connection of the rotating extension of FIGS. 1A and 1B.

In at least the embodiment shown in FIG. 1B, the connector 108 includes a mechanically coded portion 116 configured to mate with a matingly configured mechanically coded opening 118 formed in the connection end 112 of the body 106 to enable the connector 108 to lock the body 106 into a number of particular positions relative to the miter saw base 62. For example, as shown in FIG. 2, the mechanically coded portion 116 can include a peg 120 and spokes 122 projecting outwardly from the peg 120 at predefined intervals. In the embodiment shown, the mechanically coded portion 116 includes eight spokes 122. However, in alternative embodiments, the mechanically coded portion 116 can include more or fewer than eight spokes 122. The spokes 122 are spaced about the peg 120 at regular angular intervals. The matingly configured mechanically coded opening 118 includes eight spoke receivers 124 to correspondingly receive each of the eight spokes 122. To rotate the body 106 relative to the base 62, the user matingly connects the body 106 with the connector 108 such that each of the spokes 122 is received within a spoke receiver 124. Thus, the body 106 is positioned in a predetermined position relative to the base 62 such that the body axis 110 is arranged at a predetermined angle relative to the longitudinal direction 68 based on the direction of the body axis 110 when the spokes 122 are received within the spoke receivers 124.

Accordingly, the body 106 can be locked at each of the particular positions A, B, C (shown in FIGS. 1A and 1B). The particular angle of the body axis 110 relative to the longitudinal direction 68 when the body 106 is locked onto the connector 108 is determined by the number of spokes 122 and the angles of the spokes 122 relative to the longitudinal direction 68 as well as the angles of the spoke receivers 124 relative to the body axis 110. It is to be understood that in alternative embodiments, the connector 108 and the body 106 can be configured to lock the body 106 into more or fewer than positions than described above and that the connector 108 can be configured to lock the body 106 into positions at different angles than those mentioned in this example.

Figure 3:
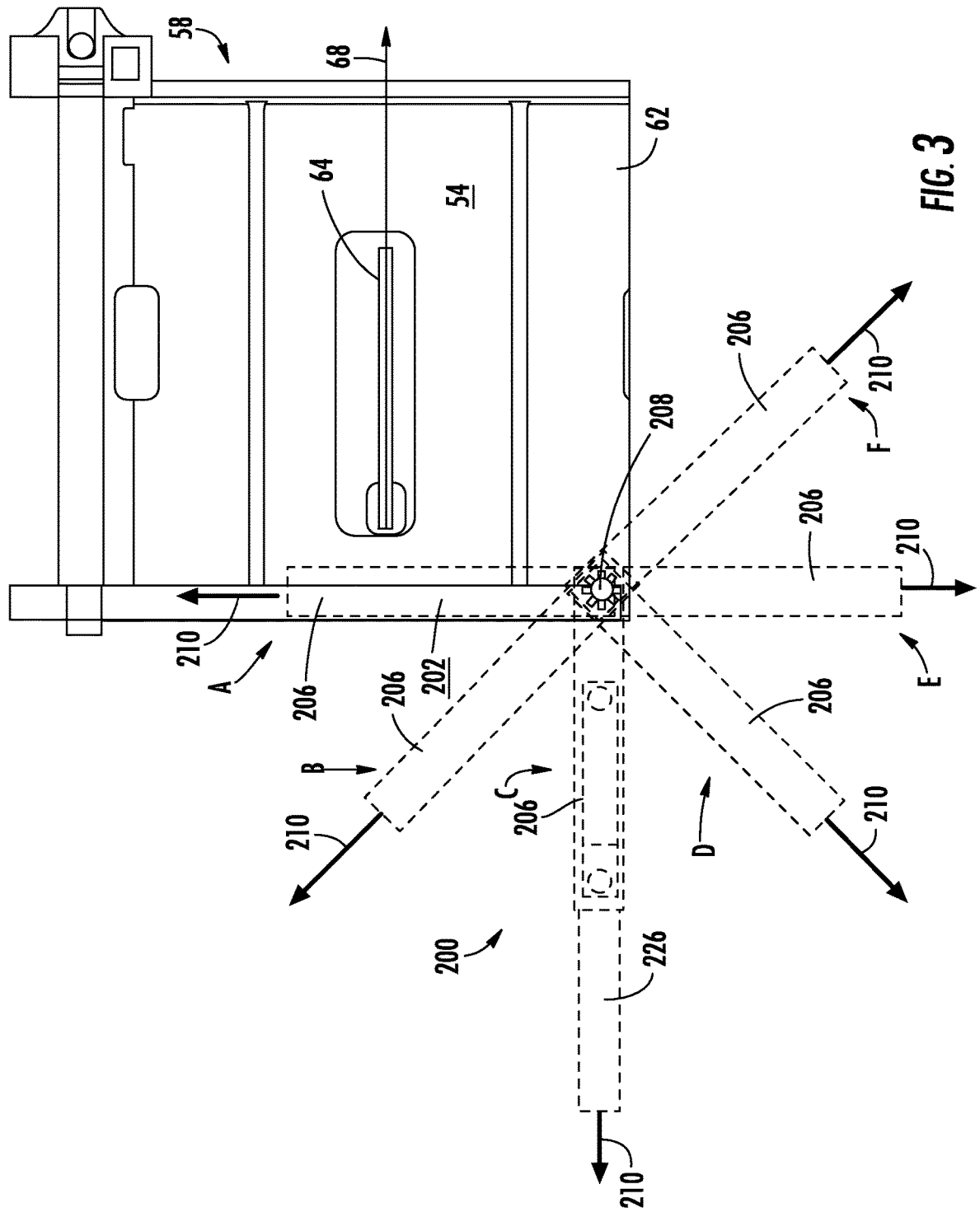
FIG. 3 depicts a top plan view of a table saw having another embodiment of a rotating extension coupled thereto.

Turning now to FIG. 3, a rotating extension 200, substantially similar to the rotating extension 100 described above and shown in FIGS. 1A and 1B, is shown coupled to a base 62 of a table saw. Similar parts of the rotating extension 200 are numbered similarly to those of extension 100. When coupled to the table saw base 62, the rotating extension 200 can be positioned in, for example, six positions by locking the body 206 with the connector 208 in different positions relative to the longitudinal direction 68 of the blade opening 64. When the connector 208 locks the body 206 into a first position A, the body axis 210 is arranged perpendicularly, or at a two-hundred seventy degree angle, relative to the blade opening 64 in the table saw base 62. In the first position A, the rotating extension 200 is in a storage position and does not interfere with the use of the table saw 128. However, because the table saw base 62 is located underneath the body 206 in the first position A, the upper surface 202 of the body 206 is not coplanar with the work surface 54 of the table saw when the body 206 is in the first position A.

When the connector 208 locks the body 206 into a second position B, the body axis 210 is arranged at a two-hundred twenty-five degree angle relative to the blade opening 64. In the second position B, the rotating extension 200 projects somewhat behind the table saw 58, enabling support of a workpiece that is somewhat wider than the work surface 54 of the table saw 58. When the connector 208 locks the body 206 into a third position C, the body axis 210 is arranged parallel, or at a one-hundred eighty degree angle, relative to the blade opening 64. In the third position C, the rotating extension 200 projects substantially behind the table saw 58, enabling support of a workpiece that is substantially wider than the work surface 54 of the table saw 128. When the connector 208 locks the body 206 into a fourth position D, the body axis 210 is arranged at a one-hundred thirty-five degree angle, relative to the blade opening 64. In the fourth position D, the rotating extension 200 projects somewhat behind and somewhat to the side of the table saw 58, enabling support of a workpiece that is somewhat wider and somewhat longer than the work surface 54 of the table saw 58. When the connector 208 locks the body 206 into a fifth position E, the body axis 210 is arranged perpendicularly, or at a ninety degree angle, relative to the blade opening 64. In the fifth position E, the rotating extension 200 projects substantially to the side of the table saw 58, enabling support of a workpiece that is substantially longer than the work surface 54 of the table saw 58. When the connector 208 locks the extension member 206 into a sixth position F, the body axis 210 is arranged at a forty-five degree angle, relative to the blade opening 64. In the sixth position F, the rotating extension 200 projects somewhat to the side of the table saw 58, enabling support of a workpiece that is somewhat longer than the work surface 54 of the table saw 58. It is to be understood that in alternative embodiments, the connector 208 can be configured to lock the body 206 into more or fewer than six particular positions and that the connector 208 can be configured to lock the body 206 into positions at different angles than those mentioned in this example.

In at least one embodiment, the rotating extension 200 can include a plurality of bodies 206 all coupled to the connector 208 and configured to nest within one another. The bodies 206 can be un-nested from one another and rotated to desired angles relative to the blade opening 64 to support workpieces of varying shapes and sizes. When the bodies 206 are not in use, they can be nested within one another and stored in a stowed position.

Figure 4A:
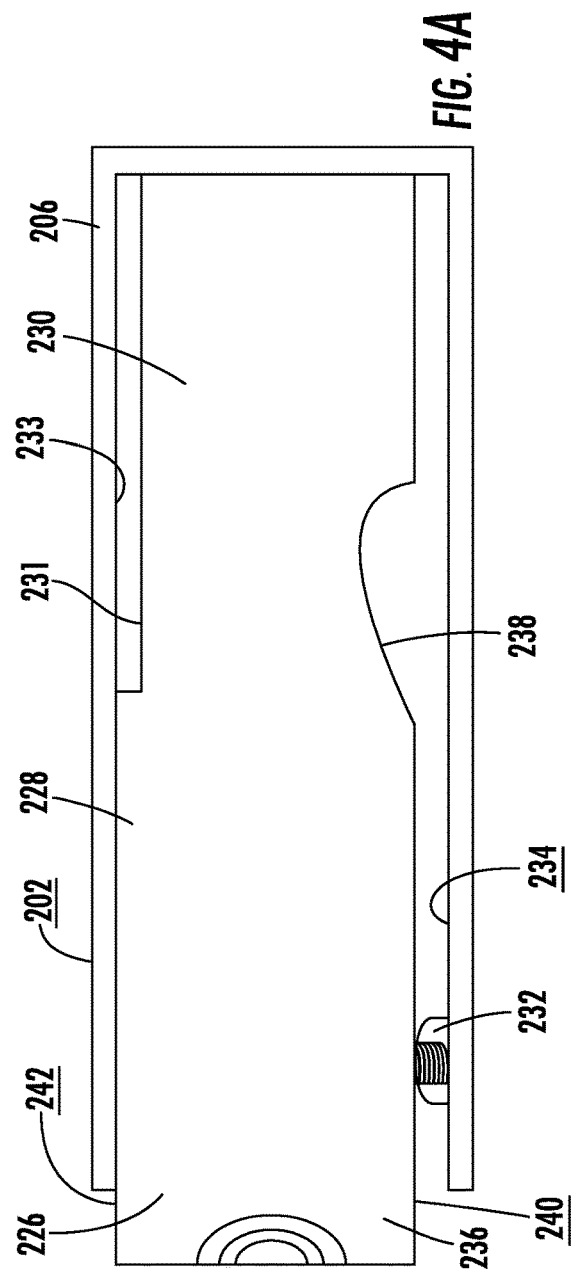
FIG. 4A depicts a side cross-sectional view of a telescoping projection of the rotating extension of FIG. 3 in a received position.
Figure 4B:
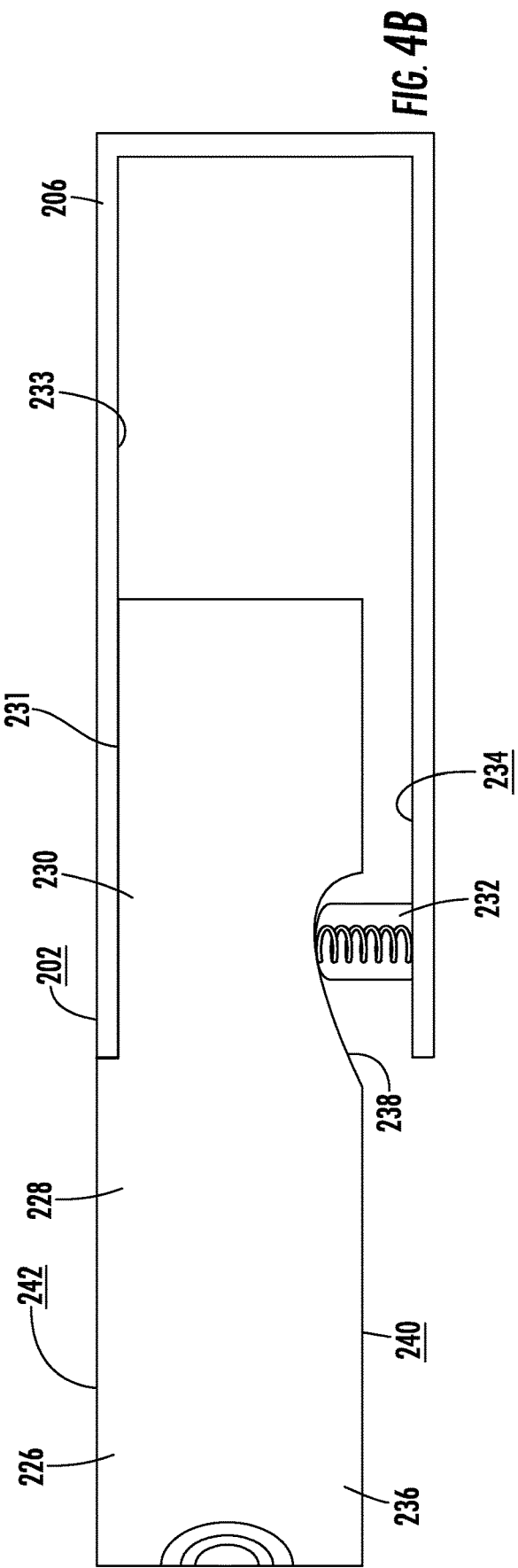
FIG. 4B depicts a side cross-sectional view of a telescoping projection of the rotating extension of FIG. 3 in an extended position.

In another embodiment, the rotating extension 200 can include a telescoping portion 226 configured to be slideably received within the body 206. An example of the telescoping portion 226 is shown in FIGS. 4A and 4B, although, other configurations or arrangements are possible. As shown in FIGS. 4A and 4B, the telescoping portion 226 includes an extending portion 228 and a received portion 230. The received portion 230 includes a notch 231 wherein the cross-section of the telescoping portion 226 is less than at the extending portion 228. The body 206 which receives the telescoping portion 226 includes an internal top surface 233, and a biased projection 232 coupled to an internal bottom surface 234 of the body 206.

As shown in FIG. 4A, when the telescoping portion 226 is fully received within the body 206, in a received position, only a grip portion 236 on the extending portion 228 extends out of the body 206. Additionally, an upper surface 242 of the extending portion 228 is in contact with the internal top surface 233 within the body 206, and the extending portion 228 within the body 206 compresses the biased projection 232.

As shown in FIG. 4B, when the telescoping portion 226 is slid out of the body 206, in an extended position, the biased projection 232 extends upwardly into a notch 238 formed in an external bottom surface 240 of the received portion 230. When the biased projection 232 extends upwardly, it forces the extending portion 228 of the telescoping portion 226 upwardly also until the notch 231 is in contact with the internal top surface 233 within the body 206 and the upper surface 242 of the extending portion 228 is coplanar with the upper surface 202 of the body 206. The extent to which the telescoping portion 226 can be slid out of the body 206 is limited by the reception of the biased projection 232 within the notch 238.

To slide the telescoping portion 226 out of the body 206, a user grips the grip portion 236 and pulls the extending portion 228 outwardly. To slide the telescoping portion 226 back into the body 206, the user pushes the extending portion 228 inwardly. The shape of the notch 238 re-compresses the biased projection 232 as the received portion 230 slides inwardly. By sliding the telescoping portion 226 outwardly from the body 206, and bringing the upper surface 242 to be coplanar with the upper surface 202, the upper surface 202 of the body 206 to support the workpiece is extended. When the extra support area is not needed, the telescoping portion 226 is slid inwardly back into the body 206.

Figure 5:
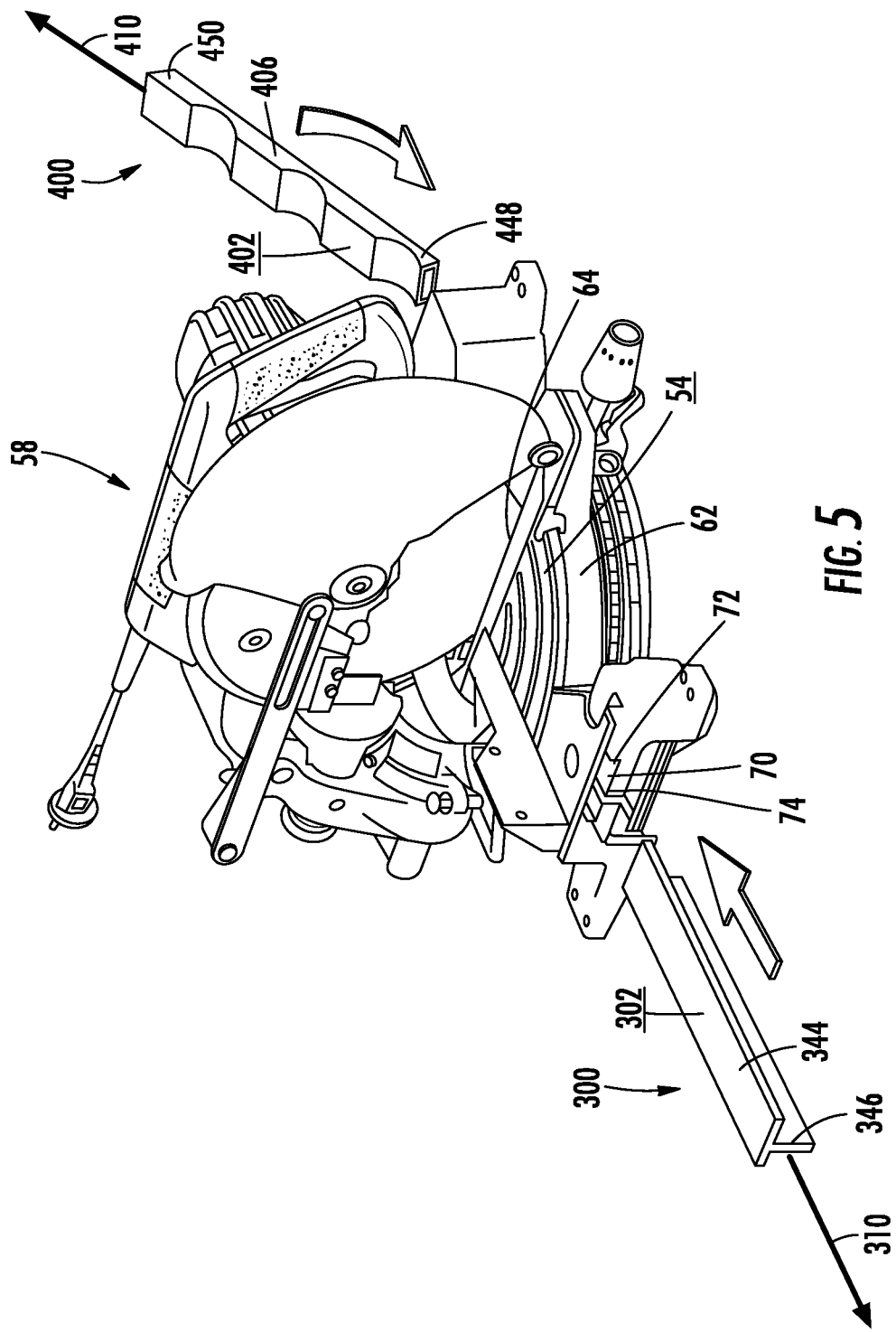
FIG. 5 is a top perspective view of a miter saw with a sliding extension and a hooking extension detached therefrom.

Turning now to FIG. 5, a miter saw 58 is shown including a sliding extension 300 (on the left side of the figure) and a hooking extension 400 (on the right side of the figure). The sliding extension 300 is configured to be slidably received within a sliding mating opening 70, having a shape that is complementary to the sliding extension 300, formed in the miter saw base 62. The sliding extension 300 has a T-shaped cross-section including a top portion 344, which includes the upper surface 302, and a stem portion 346 extending below and perpendicular relative to the top portion 344. The upper surface 302 of the top portion 344 of the extension 300 is coplanar with the work surface 54 of the miter saw 58 when the extension 300 is received in the sliding mating opening 70 and provides a stable surface on which the workpiece can rest. The stem portion 346 is located below the plane 50 of the work surface 54 and provides additional structural support to the top portion 344 while maintaining a low weight for the sliding extension 300.

The sliding mating opening 70 includes an inverse top opening portion 72 and an inverse stem opening portion 74 formed in the miter saw base 62 and configured to receive the top portion 344 and the stem portion 346 of the sliding extension 300, respectively, so that the sliding extension 130 can be matingly received within the sliding mating opening 70. The top opening portion 72 is open at the top to enable the upper surface 302 of the sliding extension 300 to be coplanar with the work surface 54 when the sliding extension 300 is received within the sliding mating opening 70.

In use, the sliding extension 300 is coupled to the miter saw base 62 and then slides within the sliding mating opening 70 to move inwardly and outwardly relative to the miter saw base 62. When the sliding extension 300 is slid inwardly relative to the miter saw base 62, a smaller amount of the top portion 344 is exposed next to the miter saw base 62. Accordingly, in the inward position, the sliding extension 300 provides support for a workpiece that is somewhat longer than the miter saw work surface 54. When the sliding extension 300 is slid outwardly relative to the miter saw base 62, a larger amount of the top portion 344 is exposed next to the miter saw base 62. Accordingly, in the outward position, the sliding extension 300 provides support for a workpiece that is substantially longer than the miter saw work surface 54.

Due to the complementary shapes of the sliding extension 300 and the sliding mating opening 70, the angle at which the body axis 310 of the body 306 of the sliding extension 300 is positioned relative to the blade opening 64 of the miter saw 58 is determined by the angle of the sliding mating opening 70 relative to the blade opening 64. In this embodiment, the sliding mating opening 70 is arranged perpendicularly relative to the blade opening 64. Accordingly, in this embodiment, the sliding extension 300 is arranged perpendicularly relative to the blade opening 64 to provide support for a workpiece that is longer than the miter saw work surface 54. It is to be understood, however, that in alternative embodiments, the sliding extension 300 can be configured to extend from the miter saw 58 at a different angle than that used in this example and thereby provide support to workpieces of different shapes and sizes.

The hooking extension 400 is configured to be hooked into a hooking mating opening 144 (shown in FIG. 6) formed in the miter saw base 62. The hooking extension 400 has a body 406 formed as a hollow, substantially rectangular member including an insertion end 448 and an extension end 450. The body 406 also includes an upper surface 402 which extends from the insertion end 448 to the extension end 450. The body 406 also includes at least one pinch 452 formed in the upper surface 202 of the hooking extension 400 which is irregular relative to the rectangular shape of the remainder of the body 406. The cross-sectional view of the hooking extension 400 shown in FIG. 6 is taken along a direction perpendicularly to the body axis 410, showing that the hooking extension 400 has a smaller cross-section at the pinch 452 than at the remainder of the hooking extension 400.

In the embodiment shown, the hooking extension 400 includes three pinches 452. It will be understood, however, that the hooking extension 400 can include more or fewer than three pinches 452 and that the pinches 452 can be positioned in various locations along the hooking extension 400.

Figure 6:
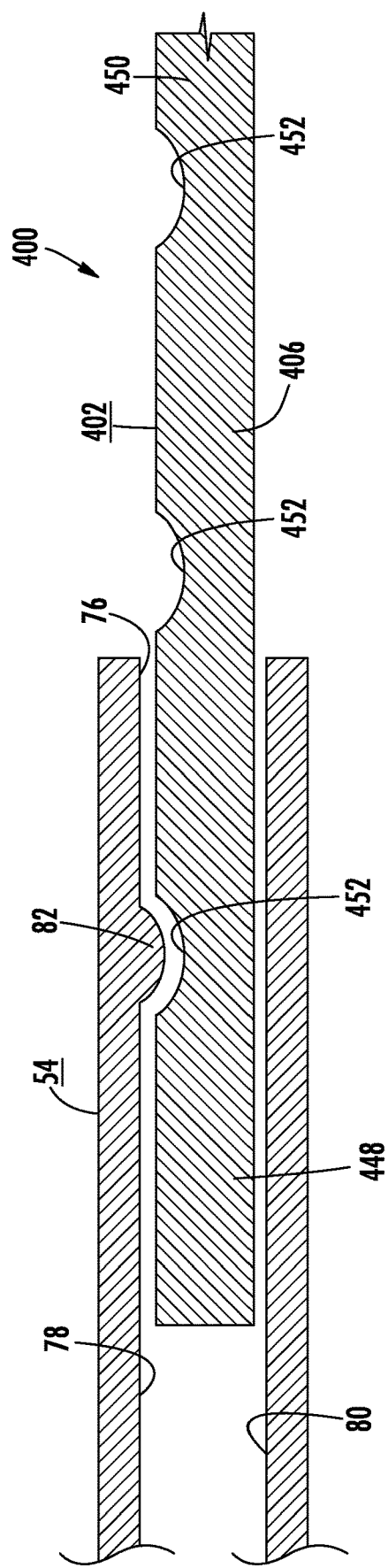
FIG. 6 is a side cross-sectional view of a portion of the miter saw and the hooking extension shown in FIG. 5 attached thereto.

As shown in FIG. 6, the hooking mating opening 76 is formed as a rectangular opening having a top 78, a bottom 80, and a bump 82 formed in the top 78 of the hooking mating opening 76. The bump 82 projects into the rectangular opening to decrease the cross-section of the hooking mating opening 76 at the bump 82. Accordingly, the hooking mating opening 76 is configured to receive the body 406 of the hooking extension 400 by mating one of the pinches 452 formed in the hooking extension 400 with the bump 82 formed in the hooking mating opening 76.

To insert the hooking extension 400 into the miter saw base 62, the insertion end 448 of the hooking extension 400 is aligned with the hooking mating opening 76. Next, the extension end 450 of the hooking extension 400 is raised above the work surface 54 while the insertion end 448 is inserted into the hooking mating opening 76. Once the bump 82 of the hooking mating opening 76 enters one of the pinches 452 of the hooking extension 400, the extension end 450 of the hooking extension 400 is lowered downwardly to lock the bump 82 within the pinch 452. When the bump 82 is locked within the pinch 452, the hooking extension 400 is retained in a position such that the upper surface 402 of the body 406 is substantially coplanar with the work surface 54. The hooking extension 400 is retained in this horizontal position by frictional contact between the upper surface 402 of the hooking extension 400 and the top 78 of the hooking mating opening 76 at a location inwardly adjacent to the bump 82.

To remove the hooking extension 400 from the miter saw base 62, the process is reversed. To change the length of the hooking extension 400 relative to the miter saw base 62, the bump 82 can be mated with different pinches 452. For example, for a shorter extension, the bump 82 can be mated with the pinch 452 formed nearest the extension end 450 of the hooking extension 400, for a medium-length extension, the bump 82 can be mated with the middle pinch 452 in the hooking extension 400, and for a longer extension, the bump 82 can be mated with the pinch 452 formed nearest the insertion end 448 of the hooking extension 400.

Due to the complementary shapes of the hooking extension 400 and the hooking mating opening 76, the angle at which the hooking extension 400 is positioned relative to the blade opening 64 of the miter saw 58 (shown in FIG. 5) is determined by the angle of the hooking mating opening 76 relative to the blade opening 64. In this embodiment, the hooking mating opening 76 is arranged perpendicularly relative to the blade opening 64. Accordingly, in this embodiment, the hooking extension 400 is arranged perpendicularly relative to the blade opening 64 to provide support for a workpiece that is longer than the miter saw work surface 54. It is to be understood, however, that in alternative embodiments, the hooking extension 400 can be configured to extend from the miter saw 58 at a different angle than that used in this example and thereby provide support to workpieces of different shapes and sizes.

Figure 7:
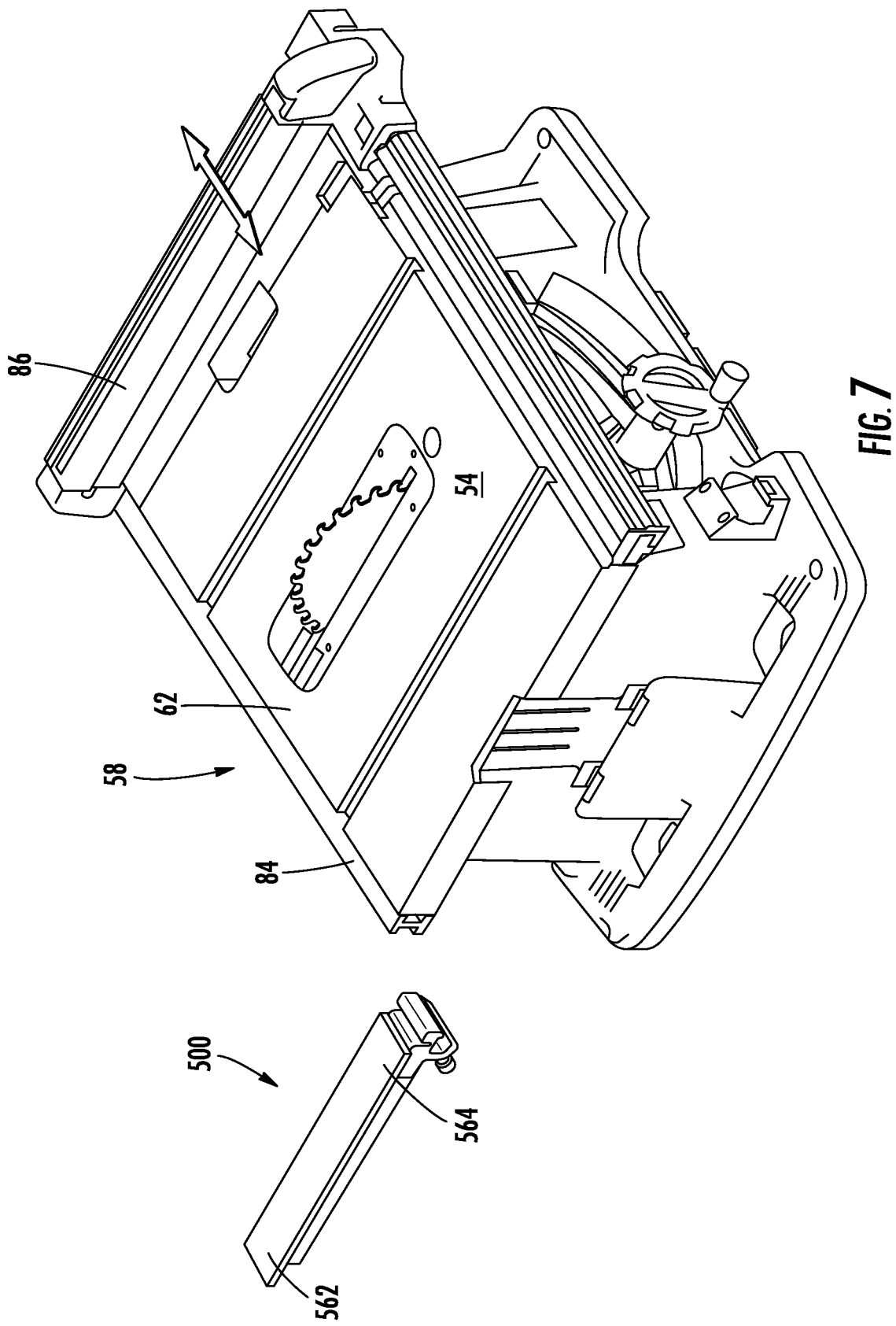
FIG. 7 is a top perspective view of a table saw with a rail sliding extension detached therefrom.
Figure 8:
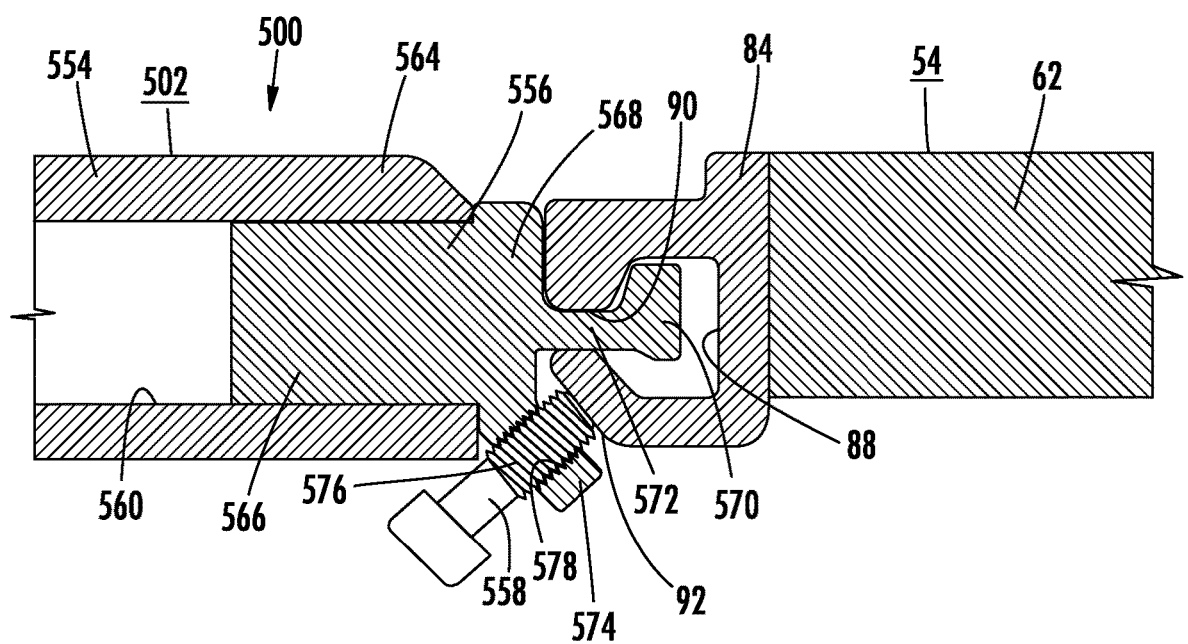
FIG. 8 depicts a side plan view of a connection between the table saw and the rail sliding extension of FIG. 7.

Turning now to FIG. 7, a rail sliding extension 500, is shown detached from a table saw 58. The rail sliding extension 500 is configured to slide within a fence rail 84 configured to support a fence 86 of the table saw 58. As shown more clearly in FIG. 8, the rail sliding extension 500 includes an extension portion 554, a connecting portion 556, and a leveling screw 558. The extension portion 554 includes an upper surface 502 configured to provide support to a workpiece resting thereon. When the rail sliding extension 500 is coupled to the table saw 58 (as shown in FIG. 8), the upper surface 502 is coplanar with the work surface 54 of the table saw 58. The extension portion 554 further includes an inner portion 560, configured to accommodate the connecting portion 556, an extension end 562 (shown in FIG. 7), arranged away from the table saw 58, and a connection end 564, arranged adjacent to the table saw 58.

The connecting portion 556 includes an extension end 566, configured to be fixedly received within the extension portion 554, and a rail end 568, configured to matingly slide within the fence rail 84 of the table saw 58. The rail end 568 of the extension end 556 includes a head 570, a neck 572, and a leveling portion 574. The neck 572 and the leveling portion 574 of the rail end 568 are arranged adjacent to the extension end 566 of the connecting portion 556, and the head 570 is supported by the neck 572 and is positioned so as to project away from the extension end 566. The head 570 of the rail end 568 is configured to fit within a cavity 88 of the fence rail 84, and the neck 572 is configured to fit within a slot 90 of the fence rail 84, such that the rail sliding extension 500 is coupled to, and is able to slide along, the fence rail 84 of the table saw 58. The leveling portion 574 is configured so as to be substantially parallel to an angled face 92 of the fence rail 84 when the connecting portion 556 is coupled to the fence rail 84.

The leveling screw 558 of the rail sliding extension 500 includes a plurality of threads 576 configured to be threadably received through a threaded opening 578 in the leveling portion 574 of the rail end 568 of the connecting portion 556. The leveling screw 558 is further configured to contact the angled face 92 of the fence rail 84. Because the extension portion 554 of the rail sliding extension 500 is cantilevered relative to the base 62 of the table saw 58 via the connecting portion 556 received in the fence rail 84, when the leveling screw 558 is not tightened, gravity pulls the extension end 562 of the extension portion 554 downwardly, thereby raising the connection end 564 of the extension portion 554. When the leveling screw 558 is tightened, the threads 576 of the leveling screw 558 threadably engage the threaded opening 578 in the leveling portion 574, thereby bringing the leveling portion 574 more nearly parallel to the angled face 92 of the fence rail 84. This lowers the connection end 564 of the extension portion 554, thereby raising the extension end 562 of the extension portion 554. By tightening and loosening the leveling screw 558, a user can adjust the upper surface 502 of the extension portion 554 to be as nearly coplanar with the work surface 54 of the table saw 58 as possible.

Figure 9:
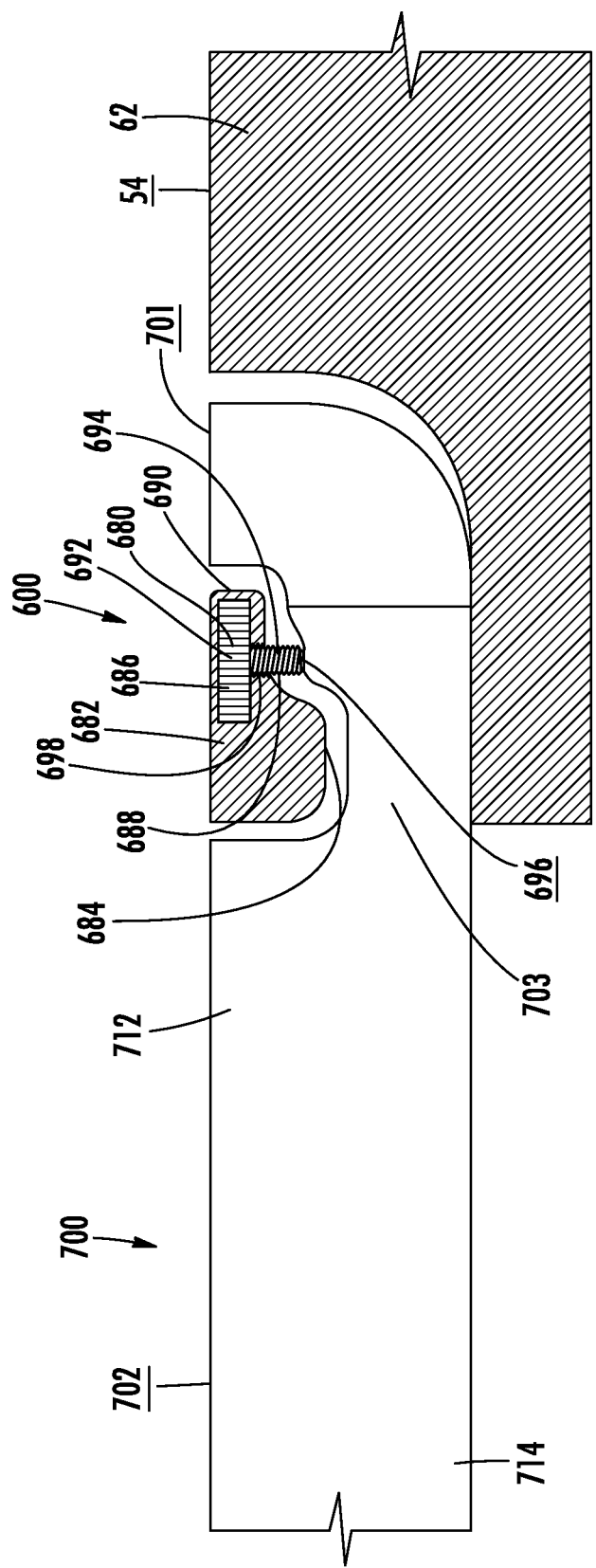
FIG. 9 depicts an embodiment of a leveling mechanism to be used in a connection between an extension and a base.
Figure 10:
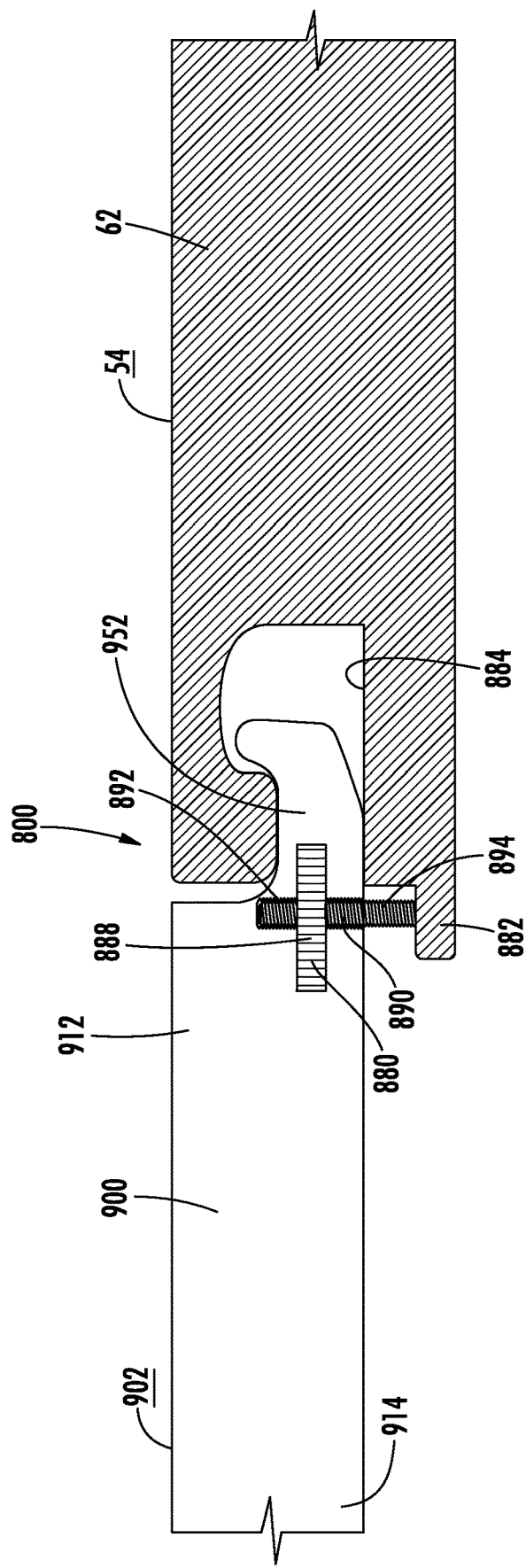
FIG. 10 depicts another embodiment of a leveling mechanism to be used in a connection between an extension and a base.

FIG. 9 and FIG. 10 depict two other alternative embodiments for leveling mechanisms 600, 800 for hooking extensions (like that shown in FIG. 6) or rail sliding extensions (like that shown in FIGS. 7 and 8). Turning to FIG. 9, the leveling mechanism 600 is integrally formed in the base 62 of the bench top power tool or workbench 58, and the leveling mechanism 600 includes a leveling wheel 680, a wheel area 682, an extension receiving opening 684, and a leveling window 690. The leveling wheel 680 is arranged within the wheel area 682, and the wheel area 682 is positioned above the extension receiving opening 684. The leveling wheel 680 has a head portion 686 and a threaded screw portion 688. The head portion 686 includes ribs 692 configured to enable a user to easily grip and rotate the leveling wheel 680. The threaded screw portion 688 includes a plurality of threads 694 and a flat contact surface 696. The wheel area 682 has a threaded portion 698 configured to thread matingly with the threaded screw portion 688 of the leveling wheel 680 to enable the leveling wheel 680 to move through the wheel area 682 into and out of the extension receiving opening 684.

In this embodiment, a leveling extension 700 includes a leveling surface 701 that is coplanar with an upper surface 702 and separated from the upper surface 702 by a pinch 703. The pinch 703 is a portion of the leveling extension 700 having a reduced cross-section relative to the remainder of the leveling extension 700. When the leveling extension 700 is inserted into the extension receiving opening 684, the wheel area 682 is received within the pinch 703, the flat contact surface 696 of the leveling wheel 680 contacts the pinch 703 of the leveling extension 700, and the leveling surface 701 of the leveling extension 700 extends into the leveling window 690. Because the leveling extension 700 is cantilevered relative to the base 62 via the wheel area 682 received within the pinch 703, when the leveling wheel 680 is not tightened, gravity pulls an extension end 714 of the leveling extension 700 downwardly, thereby raising a connection end 712 of the leveling extension 700 upwardly. When the leveling wheel 680 is tightened, the flat contact surface 696 of the leveling wheel 680 applies pressure on the connection end 712 of the leveling extension 700 at the pinch 703, forcing the connection end 712 of the leveling extension 700 downwardly, thereby raising the extension end 714 of the leveling extension 700 upwardly. By tightening and loosening the leveling wheel 680, a user can adjust the upper surface 702 of the leveling extension 700 to be as nearly coplanar with the work surface 54 of the base 62 as possible.

The leveling window 690 is provided to aid in adjusting the upper surface 702 of the leveling extension 700 to be coplanar with the work surface 54 of the base 102 by surrounding the leveling surface 701 of the leveling extension 700 with two areas of the base 62—the wheel area 682 and the remainder of the base 62. When the leveling surface 701 of the leveling extension 700 appears to be coplanar with the wheel area 682 and the remainder of the base 62, it is likely that the upper surface 702 of the leveling extension 700 is very nearly coplanar with the work surface 54 of the base 62.

Turning now to FIG. 10, the leveling mechanism 800 includes a leveling wheel 880, a ledge 882, and an extension cavity 884. The leveling wheel 880 is integrally formed with an adjustable extension 900 and includes a leveling head 888 and a threaded screw portion 890. The leveling head 888 includes a threaded opening 892 including threads configured to threadably engage threads 894 on the threaded screw portion 890. The leveling head 888 is fixedly positioned within the adjustable extension 900 so as to be parallel to an upper surface 902 of the adjustable extension 900. The ledge 882 extends outwardly from the base 62 of the bench top power tool or work bench 58 and is configured to fixedly retain the threaded screw portion 890. The extension cavity 884 is formed within the base 62 and is configured to receive a pinched portion 952 of the adjustable extension 900, the pinched portion 952 being a portion of the adjustable extension 900 having a reduced cross-section relative to the remainder of the adjustable extension 900. When the pinched portion 952 of the adjustable extension 900 is received within the extension cavity 884, the threaded screw portion 890 of the leveling wheel 880 is in contact with the ledge 882. Subsequently, rotating the leveling head 888 threadably engages the threads of the leveling head 888 with the threads 894 of the threaded screw portion 890 to raise and lower the leveling head 888 on the threaded screw portion 890.

Because the leveling head 888 is fixedly positioned within the adjustable extension 900, raising and lowering the leveling head 888 also raises and lowers the pinched portion 952 of the adjustable extension 900. Because the adjustable extension 900 is cantilevered relative to the base 62 via the pinched portion 952 received in the extension cavity 884, when the leveling head 888 is raised, gravity pulls an extension end 914 of the adjustable extension 900 downwardly, thereby raising a connection end 912 of the adjustable extension 900 upwardly. When the leveling head 888 is lowered, the leveling head 888 pulls the pinched portion 952 of the adjustable extension 900 downwardly, thereby lowering the connection end 912 and raising the extension end 914 of the adjustable extension 900 upwardly. By raising and lowering the leveling head 888, a user can adjust the upper surface 902 of the adjustable extension 900 to be as nearly coplanar with the work surface 54 of the base 62 as possible.

As shown in FIG. 11, it is possible to include multiple extensions on a single base 62 of a bench top power tool or work bench 58. For example, a rail sliding extension 500, such as that shown in FIGS. 7 and 8, can be coupled to the base 62 and a rotating extension 200, such as that shown in FIG. 3, can also be coupled to the base 62. Additionally, other types of extensions can be coupled to the base 62 using any of the connection types shown and described above as well as any other connection types which enable easy assembly and disassembly of the extensions to and from the base 62. Furthermore, as shown in FIG. 11, extensions having various cross-sections can be coupled to the base 62 at the same time. For example, an extension having an "L" shaped cross-section, an extension having a "T" shaped cross-section, and an extension having a hollow rectangularly shaped cross-section can all be attached to the base 62 at the same time. Additionally, extensions having other cross-sectional shapes which include a substantially flat, planar upper surface, a sturdy connection to the base, and a lightweight body can also be coupled to the base 62.

It is to be understood that different features of the above embodiments can be combined with one another to form alternative embodiments of universal extensions having the features that are desirable for a particular application or saw type.

What is claimed is:

1. A bench top power tool, comprising:
   a base;
   a connection peg fixedly extending from the base and including either (i) a plurality of connection spokes or (ii) a plurality of spoke receivers;
   a work surface atop the base configured to support a workpiece;
   a saw blade opening defined in the work surface, the saw blade opening defined along a longitudinal direction;
   an attachment including
      a body having a length and an upper surface that is substantially planar along substantially all of the length, and
      a connection structure configured to removably couple the body to the base, the connection structure defining a circular connection opening configured to receive the connection peg,
   wherein the connection structure includes the other of (i) the plurality of connection spokes and (ii) the plurality of spoke receivers,
   wherein the body is coupled to the base by inserting the connection peg into the connection opening, such that the connection structure extends completely around the connection peg,
   wherein, when the body is coupled to the base, each connection spoke of the plurality of connection spokes is received in a corresponding one of the spoke receivers of the plurality of spoke receivers to lock the body in a selected rotational position of a plurality of rotational positions and to prevent all rotation of the body relative to the connection peg, the base, and the work surface,
   wherein when the body is coupled to the base, the upper surface is coplanar with the work surface along substantially all of the length of the upper surface,
   wherein the body includes a projection received within the body and configured to be positioned between a received position, whereat substantially all of the projection is arranged within the body, and an extended position, whereat substantially all of the projection is arranged outside of the body, and
   wherein the projection has a projection upper surface which is located beneath the upper surface of the body when the projection is in the received position and which is coplanar with the upper surface of the body when the projection is in the extended position.

2. The bench top power tool of claim 1, wherein:
   the body defines a body axis, and
   in each rotational position of the plurality of rotational positions, the body axis is arranged at a different respective angle relative to the longitudinal direction.

3. The bench top power tool of claim 2, wherein:
   the connection structure is configured to lock the body into a first rotational position of the plurality of rotational positions, whereat the body axis is arranged at a first angle relative to the longitudinal direction, and a second rotational position of the plurality of rotational positions, whereat the body axis is arranged at a second angle relative to the longitudinal direction, and
   the first angle is different than the second angle.

4. The bench top power tool of claim 3, wherein:
   the connection structure is configured to lock the body into a third rotational position of the plurality of rotational positions, whereat the body axis is arranged at a third angle relative to the saw blade opening, and
   the third angle is different than the first angle and the second angle.

5. The bench top power tool of claim 1, wherein the body is substantially rectangular and hollow.

6. The bench top power tool of claim 1, wherein the connection peg defines a longitudinal axis that is perpendicular to the upper surface.

* * * * *